(12) United States Patent
Harper et al.

(10) Patent No.: US 9,636,761 B2
(45) Date of Patent: May 2, 2017

(54) MODULAR CUTTING SYSTEM, METHOD AND APPARATUS

(71) Applicant: Mactech, Inc., Red Wing, MN (US)

(72) Inventors: Michael James Harper, Red Wing, MN (US); Joel Kent Wittenbraker, Red Wing, MN (US)

(73) Assignee: MACTECH, INC., Red Wing, MN (US)

( * ) Notice: Subject to any disclaimer, the term of this patent is extended or adjusted under 35 U.S.C. 154(b) by 302 days.

(21) Appl. No.: 13/950,793

(22) Filed: Jul. 25, 2013

(65) Prior Publication Data

US 2015/0027287 A1 Jan. 29, 2015

(51) Int. Cl.
*B23D 57/00* (2006.01)

(52) U.S. Cl.
CPC ..... *B23D 57/0084* (2013.01); *B23D 57/0038* (2013.01); *Y10T 29/49716* (2015.01); *Y10T 83/9292* (2015.04)

(58) Field of Classification Search
CPC .. B23D 57/00; B23D 57/0007; B23D 57/003; B23D 57/0038; B23D 57/0053; B23D 57/0061; B23D 57/0069; B23D 57/0084; Y10T 83/929; Y10T 83/9292; Y10T 29/49716
USPC .......................................................... 125/21
See application file for complete search history.

(56) References Cited

U.S. PATENT DOCUMENTS

| | | |
|---|---|---|
| 482,103 A | 9/1892 | Speer |
| 1,420,950 A | 6/1922 | Elder |
| 3,055,694 A * | 9/1962 | Billner .................. B66C 1/0281 294/65 |
| 3,835,901 A | 9/1974 | Jonsson |
| 3,848,327 A * | 11/1974 | Gerber ............... A41H 43/0292 269/21 |
| 4,168,729 A * | 9/1979 | Tausig ................. A01G 23/089 144/34.5 |
| 4,532,689 A * | 8/1985 | Harder .................. B23P 19/025 29/252 |
| 5,329,562 A | 7/1994 | Kubo et al. |
| 5,361,748 A | 11/1994 | Matteucci |
| 5,524,517 A | 6/1996 | Robinson |
| 5,597,041 A | 1/1997 | Robinson |
| 6,065,462 A | 5/2000 | Hodsden et al. |
| 6,267,037 B1 | 7/2001 | McCoy, Jr. et al. |
| 6,279,564 B1 | 8/2001 | Hodsden et al. |
| 6,881,131 B2 | 4/2005 | Parsells et al. |
| 7,036,599 B2 | 5/2006 | Matteucci |
| 7,059,225 B1 * | 6/2006 | Rabell .................. B23Q 9/0042 83/13 |
| 2007/0234869 A1* | 10/2007 | Dale ....................... B27B 17/00 83/797 |
| 2007/0267006 A1 | 11/2007 | Ogyu |

(Continued)

*Primary Examiner* — Phong Nguyen (74) *Attorney, Agent, or Firm* — Lempia Summerfield Katz LLC (57) ABSTRACT

A system, a method and a modular apparatus may use a wire loop to cut an object. The apparatus may have a wire loop connected to pulleys on a deck attached to a frame. The deck may move relative to the frame to direct the wire loop through the object. The apparatus may have arms that may hold the object being cut. The apparatus may be configured with different cutting decks to reduce the overall size of the apparatus and/or to facilitate cutting a particular object in a particular environment.

11 Claims, 9 Drawing Sheets

(56) References Cited

U.S. PATENT DOCUMENTS

| | | | |
|---|---|---|---|
| 2008/0022830 A1 | 1/2008 | Lawler et al. | |
| 2008/0304915 A1 | 12/2008 | Bang | |
| 2009/0293856 A1* | 12/2009 | Jenkins | B23D 57/0007 125/14 |
| 2009/0314149 A1* | 12/2009 | Clark, II | B23D 57/0007 83/651.1 |
| 2010/0071585 A1* | 3/2010 | Wright | B61C 7/04 105/35 |
| 2010/0186564 A1* | 7/2010 | Pierce | B23D 57/0007 83/72 |
| 2011/0214543 A1 | 9/2011 | Shae et al. | |
| 2011/0271805 A1* | 11/2011 | Abadie | B23D 45/003 83/13 |
| 2012/0117959 A1* | 5/2012 | Lewkoski | B23D 57/0084 60/431 |

* cited by examiner

MODULAR CUTTING SYSTEM, METHOD AND APPARATUS

BACKGROUND OF THE INVENTION

The present invention generally relates to a cutting system, method and apparatus. More specifically, the present invention relates to a cutting apparatus having modular decks enabling different configurations of the cutting apparatus for cutting an object in a particular application.

Offshore platforms have a base structure formed by pipelines. If the offshore platforms are decommissioned and/or dismantled, the pipelines must be removed. The pipelines may extend into the sea floor. Therefore, pipelines are typically removed from the sea floor by cutting the pipelines at a location on the pipeline adjacent to the sea floor. Known systems exist for cutting the pipelines. For example, known systems for cutting the pipelines may use diamond-impregnated beads affixed to a continuous strand of rubber-encapsulated steel wire that is looped onto a drive pulley and driven at a high speed.

The known systems require clearance on multiple sides of the pipeline. The clearance required by the known systems may hinder the systems from cutting the pipeline. For example, the clearance required by the known systems may increase a distance between the cut and the sea floor. Thus, after cutting by the known systems, a portion of the pipeline may continue to extend from the sea floor. Moreover, the clearance required by the known systems may prevent the systems from cutting the pipeline if the pipeline is adjacent to obstructions. Thus, known systems may not be capable of cutting the pipeline if the pipeline is adjacent to obstructions.

Further, a diamond wire saw may be used for subsea and topside cutting of a variety of materials and projects. A diamond wire saw may be ideal for cutting multi-string applications or heavy wall legs and cross members. Typical uses for a diamond wire saw include offshore decommissioning and subsea or topside maintenance of oil drilling platforms and the like.

Moreover, saws and other cutting devices capable of cutting large pipelines and/or structures may necessarily be correspondingly large machines to accommodate the large pipelines. However, the size of the saw may preclude its use in certain environments and/or locations. Typically, space may be limited on offshore oilrigs, for example. Thus, adequate room for use of such large equipment may not be available. A need exists for a saw capable of cutting large pipelines and/or structures that may be used and/or accommodated in a limited space environment. The need also exists for a saw that may be configured in different sizes depending on the application and/or the cutting environment. Further, the need exists for a saw that may have interchangeable parts to make the saw modular.

SUMMARY OF THE INVENTION

The present invention generally relates to a cutting system, method and apparatus. More specifically, the present invention relates to a cutting apparatus having modular decks enabling different configurations of the cutting apparatus for cutting an object in a particular application. The modular design of the diamond wire saw may facilitate use in various cutting applications and/or environments. The saw may be easily customized and/or adaptable to specific project needs.

To this end, in an embodiment of the present invention, a modular cutting apparatus is provided. The apparatus may have a frame with a first end and a second end located opposite to the first end. A feed plate may be connected to the frame and a first deck. The first deck may have a wire attached to a first pulley and a second pulley. The wire may travel through the first pulley and the second pulley. The first deck may have a first circumference. The apparatus may have a second deck with a wire attached to a first pulley and a second pulley. The wire may travel through the first pulley and the second pulley. The second deck may have a second circumference that is different than the first circumference. The first deck and the second deck may be interchangeably connected to the feed plate. The feed plate may move relative to the frame from a first position at the first end of the frame to a second position at the second end of the frame.

In an embodiment, the apparatus may have a clamp at the second end of the frame.

In an embodiment, the apparatus may have an alignment plate at the second end of the frame.

In an embodiment, a drive pulley may be connected to the first deck wherein the wire travels through the drive pulley, the first pulley and the second pulley.

In an embodiment, a hydraulic circuit may be connected to a drive pulley. The drive pulley may be connected to the first deck. The wire may travel through the drive pulley, the first pulley and the second pulley.

In an embodiment, a hydraulic circuit may be connected to the feed plate.

In an embodiment, the first pulley may be adjustable.

In an embodiment, a hydraulic circuit may be connected to a clamp at the second end of the frame.

In an embodiment, a safety guard may be connected to the first deck.

In an embodiment, rings may be connected to the frame.

In an embodiment, the apparatus may have a first hollow bar and a second hollow bar of the frame. Each of the first hollow bar and the second hollow bar may have an opening. The first bar and the second bar may be substantially parallel to each other.

In an embodiment, an end plate having a plurality of hydraulic couplers may be connected at the first end of the frame.

In an embodiment, the apparatus may have a drive train with a gear on the first deck and a rack on the frame. The gear may engage the rack to move the first deck from the first position to the second position.

In another embodiment of the present invention, a method for interchanging a first deck having a first drive motor connected to a first drive pulley and a second deck having a second drive motor connected to a second drive pulley on a cutting apparatus is provided. The first drive motor may be driven by a hydraulic circuit. The method may have the steps of disconnecting the hydraulic circuit from the first drive motor on the first deck; removing the first deck from the cutting apparatus; attaching the second deck to the cutting apparatus; and connecting the hydraulic circuit to the second drive motor on the second deck.

In an embodiment, the method may have the step of removing a wire from the cutting apparatus.

In an embodiment, the first deck has a first circumference and the second deck has a second circumference. The first circumference may be different than the second circumference.

In an embodiment, the method may have the step of rotating a drive shaft connected to the first deck. Rotating the driveshaft in a first direction may move the first deck from a first position to a second position. Rotating the driveshaft in a second direction opposite to the first direction may move the first deck from the second position to the first position relative to the frame.

In another embodiment of the present invention, a system for cutting an object is provided. The system may have a frame with a feed plate connected to the frame. A first deck with a first circumference may be connected to the feed plate. The first deck may move from a first position relative to the frame to a second position relative to the frame. A drive train may be connected to the frame and to the first deck. Pulleys may be connected to the first deck and a motor may be connected to one of the pulleys. A wire may be attached to the pulleys. The wire may travel through the pulleys. The system may further have a second deck with a second circumference. The second circumference may be different than the first circumference. The first deck and the second deck may be interchangeably connected to the feed plate.

In an embodiment, a clamp may be connected to the frame.

In an embodiment, a hydraulic circuit may be connected to the motor.

It is, therefore, an advantage of the present invention to provide a system, a method and a modular apparatus for cutting an object.

Another advantage of the present invention is to provide a system, a method and a modular apparatus for cutting an object which may use a diamond-impregnated wire to cut an underwater pipeline.

A further advantage of the present invention is to provide a system, a method and a modular apparatus for cutting an object which may rotate the diamond-impregnated wire relative to the plane of the cut.

Yet another advantage of the present invention is to provide a system, a method and a modular apparatus for cutting an object which may reduce wear on the diamond-impregnated wire relative to known cutting apparatuses.

Another advantage of the present invention is to provide a system, a method and a modular apparatus for cutting an object which may reduce time required to cut an object relative to known cutting apparatuses.

A further advantage of the present invention is to provide a system, a method and a modular apparatus for cutting an object which may reduce space required to install and/or operate the apparatus relative to known cutting apparatuses.

Yet another advantage of the present invention is to provide a system, a method and a modular apparatus for cutting an object which may reduce space required to transport and/or store the apparatus relative to known cutting apparatuses.

Another advantage of the present invention is to provide a system, a method and a modular apparatus for cutting an object which may be controlled using a remotely operated vehicle ("ROV") interface.

A further advantage of the present invention is to provide a system, a method and a modular apparatus for cutting an object which may operate using hydraulic power.

Yet another advantage of the present invention is to provide a system, a method and a modular apparatus for cutting an object which may cut a pipeline having a large diameter.

Another advantage of the present invention is to provide a system, a method and a modular apparatus for cutting an object which may enable replacement of the diamond-impregnated wire without removing the apparatus from a pipeline.

A further advantage of the present invention is to provide a system, a method and a modular apparatus for cutting an object which may cut adjacent to a seabed without excavation of the seabed.

Yet another advantage of the present invention is to provide a system, a method and a modular apparatus for cutting an object which may reduce a volume of excavation for sub-seabed cuts relative to known cutting devices.

Another advantage of the present invention is to provide a system, a method and a modular apparatus for cutting an object which may have a self-compensating feed circuit which may automatically adjust the feed rate to an efficient cutting speed.

Yet another advantage of the present invention is to provide a system, a method and a modular apparatus for cutting an object which may be installed in any orientation.

Another advantage of the present invention is to provide a system, a method and a modular apparatus for cutting an object which may use a diamond wire.

A further advantage of the present invention is to provide a system, a method and a modular apparatus for cutting an object which may reduce labor and/or time required to install and/or remove the apparatus relative to known cutting apparatuses.

Yet another advantage of the present invention is to provide a system, a method and a modular apparatus for cutting an object which may cut multiple-string underwater pipelines which may contain aggregate fill material.

Another advantage of the present invention is to provide a system, a method and a modular apparatus for cutting an object which may achieve linear wire travel.

Moreover, an advantage of the present invention is to provide a system, a method and a modular apparatus for cutting an object which may reduce the weight of the apparatus relative to known cutting apparatuses.

Another advantage of the present invention is to provide a system, a method and a modular apparatus for cutting an object which may also have a rigid frame to improve accuracy and/or repeatability and/or to simplify back-cutting.

A further advantage of the present invention is to provide a system, a method and a modular apparatus for cutting an object which may have a continuous loop diamond wire that may be used to make multiple cuts with a single wire.

Yet another advantage of the present invention is to provide a system, a method and a modular apparatus for cutting an object which may cut faster and the wire may last longer than cutting wires that are made from electroplated and/or sintered wire.

Moreover, an advantage of the present invention is to provide a system, a method and a modular apparatus for cutting an object which may be configured to reduce the size of the apparatus for use, transporting and/or shipping.

Another advantage of the present invention is to provide a system, a method and a modular apparatus for cutting an object which may be configured to reduce the size of the apparatus when not in use and/or for storage.

A further advantage of the present invention is to provide a system, a method and a modular apparatus for cutting an object which may have a hydraulic circuit to operate a drive motor for wire rotation and/or a hydraulic circuit to operate a feed motor for translating the wire frame into the pipe or structure to be cut, and/or a hydraulic circuit to operate clamping arms to hold the pipe or structure to be cut.

Yet another advantage of the present invention is to provide a system, a method and a modular apparatus for cutting an object which may use a hydraulic motor to drive a spur gear against a rack for the translation motion of a deck. The deck may ride on a series of double v-rollers on a pair of v-rails fixed to the feed plate.

Additional features and advantages of the present invention are described in, and will be apparent from, the detailed description of the presently preferred embodiments and from the drawings.

DETAILED DESCRIPTION OF THE PREFERRED EMBODIMENTS

The present invention generally relates to a cutting system, method and apparatus. More specifically, the present invention relates to a cutting apparatus having modular decks enabling different configurations of the cutting apparatus for cutting an object in a particular application. To this end, in an embodiment of the present invention, a modular cutting apparatus is provided. The apparatus may have a frame with a first end and a second end located opposite to the first end. A feed plate may be connected to the frame and a first deck. The first deck may have a wire attached to a first pulley and a second pulley. The wire may travel through the first pulley and the second pulley. The first deck may have a first circumference. The apparatus may have a second deck with a wire attached to a first pulley and a second pulley. The wire may travel through the first pulley and the second pulley. The second deck may have a second circumference that is different than the first circumference. The first deck and the second deck may be interchangeably connected to the feed plate. The feed plate may move relative to the frame from a first position at the first end of the frame to a second position at the second end of the frame.

Referring now to the drawings wherein like numerals refer to like parts, FIGS. 1, 2, 3A, 3B, and 4-11 generally illustrate a cutting apparatus 10 in embodiments of the present invention. The cutting apparatus 10 may have a frame 100. A feed plate 105 may be connected to the frame 100. A first deck 200 may be connected to the feed plate 105. The feed plate 105 may facilitate translation of the first deck 200 with respect to the frame 100. Thus, the first deck 200 may move relative to the frame 100 as described in more detail hereafter.

The first deck 200 may have a first end 210 and a second end 220 located in a position opposite to the first end 210. The first deck 200 may also have at least two pulleys. For example, the first deck 200 may have a first pulley 201, a second pulley 202, a third pulley 203 and/or a fourth pulley 204. The first pulley 201 and the second pulley 202 may be located adjacent to the first end 210 of the first deck 200. The first pulley 201 and/or the second pulley 202 may be adjustable tension pulleys as described in more detail hereafter. The third pulley 203 and the fourth pulley 204 may be located adjacent to the second end 220 of the first deck 200. Further, the third pulley 203 and the fourth pulley 204 may be fixed pulleys. The third pulley 203 and/or the fourth pulley 204 may be a drive pulley or a motorized driven pulley. The first deck 200 may also have additional pulleys. The operation of the pulleys is described in more detail hereafter.

A wire 50 may be connected to the first deck 200. For example, the wire 50 may be connected to the first pulley 201, the second pulley 202, the third pulley 203 and/or the fourth pulley 204. For example, in an embodiment, the wire 50 may be a loop having a fixed length that travels through each of the first pulley 201, the second pulley 202, the third pulley 203 and/or the fourth pulley 204. Diamond beads may be adhered to, impregnated into and/or affixed on the wire 50. The wire 50 may have a surface area, and the diamond beads may be distributed substantially continuously and/or evenly over the surface area of the wire 50. In an embodiment, the diamond beads may be sintered to the wire 50. In another embodiment, the diamond beads may be electroplated on the wire 50 by using electric current to coat the wire 50 with at least a single layer of the diamond beads. In an embodiment, the wire 50 may be a steel wire. The present invention is not limited to a specific embodiment of the wire 50.

One or more of the first pulley 201, the second pulley 202, the third pulley 203 and/or the fourth pulley 204 may be referred to as a motorized pulley, a drive pulley and/or a motorized drive pulley. In particular, FIGS. 1, 2, 3A and 5-7 illustrate the third pulley 203 and the fourth pulley 204 as motorized pulleys. Although two motorized pulleys are illustrated in both the first embodiment shown in FIG. 1 and the second embodiment shown in FIG. 5, any number of motorized pulleys may be used. The third pulley 203 may be connected to a first drive pulley motor 205 which may provide power to the third pulley 203. The first drive pulley motor 205 may be directly attached to the third pulley 203. As shown in FIGS. 1, 2, 3A and 5-7, the first drive pulley motor 205 may be located below the third pulley 203. The drive pulley motor 205 may adjust the speed of the third pulley 203 to control the feed rate at which the wire 50 may travel through each of the each of the first pulley 201, the second pulley 202, the third pulley 203 and/or the fourth pulley 204.

Similarly, the fourth pulley 204 may be connected to a second drive pulley motor 206 which may provide power to the fourth pulley 204. The second drive pulley motor 206 may be directly attached to the fourth pulley 204. As shown in FIGS. 1, 2, 3A and 5-7, the second drive pulley motor 206 may be located below the fourth pulley 204. The second drive pulley motor 206 may adjust the speed of the fourth pulley 204 to control the feed rate at which the wire 50 may travel through each of the each of the first pulley 201, the second pulley 202, the third pulley 203 and/or the fourth pulley 204.

In an embodiment, the first drive pulley motor 205 and/or the second drive pulley motor 206 may be a hydraulic motor. However, the first drive pulley motor 205 and/or the second drive pulley motor 206 may be any motor known to one having ordinary skill in the art, such as a pneumatic motor, for example. Thus, the first drive pulley motor 205 may have first hydraulic lines 211 connected thereto. Similarly, the second drive pulley motor 206 may have second hydraulic lines 212 connected thereto.

Figure 9:
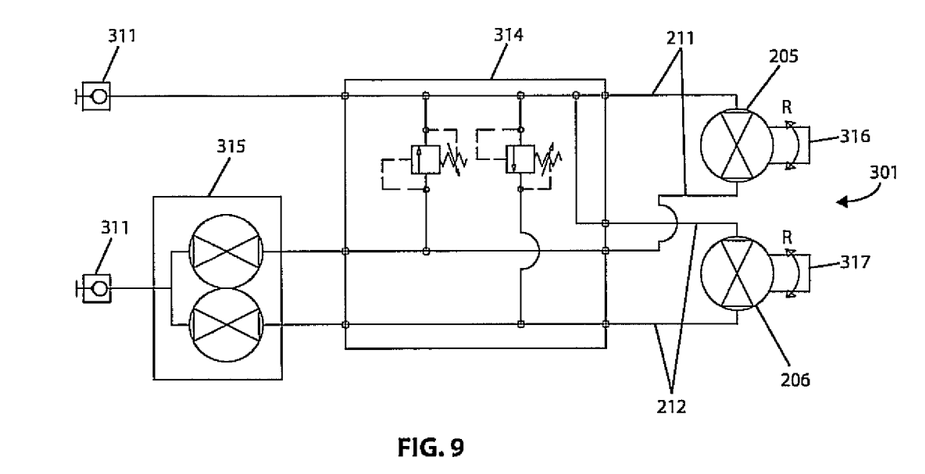
FIG. 9 illustrates a schematic diagram of a first hydraulic circuit for driving a motorized pulley of a cutting apparatus in an embodiment of the present invention.

FIG. 9 illustrates a schematic diagram of a first hydraulic circuit 301 for driving the motorized pulleys, namely the third pulley 203 and the fourth pulley 204 of a cutting apparatus 10 in an embodiment of the present invention. The first hydraulic circuit 301 may be used to enable the first drive pulley motor 205 to drive the third pulley 203 and to enable the second drive pulley motor 206 to drive the fourth pulley 204. The third pulley 203 and/or the fourth pulley 204 may rotate to direct the wire 50 through the first pulley 201, the second pulley 202, the third pulley 203 and/or the fourth pulley 204. The first drive pulley motor 205 may control a rotation rate of the third pulley 203. The first drive pulley motor 205 may control a wire speed at which the wire 50 travels through the first pulley 201, the second pulley 202, the third pulley 203 and/or the fourth pulley 204 by adjusting the rotation rate of the third pulley 203. Similarly, the second drive pulley motor 206 may control a rotation rate of the fourth pulley 204. The second drive pulley motor 206 may control a wire speed at which the wire 50 travels through the first pulley 201, the second pulley 202, the third pulley 203 and/or the fourth pulley 204 by adjusting the rotation rate of the fourth pulley 204. The present invention is not limited to a specific embodiment of the motorized pulley or the number of pulleys which are motorized, and the motorized pulley may be any pulley which directs the wire 50 through the first pulley 201, the second pulley 202, the third pulley 203 and/or the fourth pulley 204. The operation and connectivity of the first hydraulic circuit 301 of FIG. 9 are described in more detail hereafter.

A safety guard 207 may be connected along an outer edge of the first deck 200. The safety guard 207 may restrict the wire 50 from flying off the first deck 200 in case of a break of the wire 50. The safety guard 207 may also prevent a user from accidently coming into contact with the wire 50 during operation and/or at any other time.

In the first embodiment shown in FIGS. 1, 2, 3A, 3B and 4, the frame 100 may have a first side 111 and a second side 112 which may be substantially parallel to each other. The frame 100 may have a first end 121 and a second end 122 located in a position opposite to the first end 121. The frame 100 may have an end bar 110 connected to the first end 121 of the frame 100. The frame 100 may also have a first bar 113 and/or a second bar 114. The end bar 110, the first bar 113 and/or the second bar 114 may connect the first side 111 to the second side 112. The first bar 113 may be connected nearer to the first end 121 of the frame 100. The second bar 114 may be connected nearer to the second end 122 of the frame 100. The first bar 113 and/or the second bar 114 may be substantially perpendicular to the first side 111 and/or the second side 112. The first bar 113 and/or the second bar 114 may be substantially parallel to each other. The first bar 113 and/or the second bar 114 may be hollow so that a fork truck may be used for handling the cutting apparatus 10. For example, the forks of a forklift and/or fork truck may be inserted into and fit within an opening 123 in the first bar 113 and/or the second bar 114. The first bar 113 and/or the second bar 114 may be separated by a distance and positioned under the first side 111 and/or the second side 112 so that the fork truck may properly and safely lift the cutting apparatus 10 using the first bar 113 and/or the second bar 114. In an embodiment, the cutting apparatus 10 may have additional components for rigging the cutting apparatus 10 with a crane or other lifting device described in more detail hereafter.

The frame 100 may have a first crossbar 115 and a second crossbar 116 located at the second end 122 of the frame 100. Both the first crossbar 115 and the second crossbar 116 may connect the first side 111 of the frame 100 to the second side 112 of the frame 100. The first crossbar 115 and/or the second crossbar 116 may be substantially perpendicular to the first side 111 and/or the second side 112 of the frame 100. The first crossbar 115 and the second crossbar 116 may be substantially parallel to each other.

The cutting apparatus 10 may have first lifting rings 118. As illustrated in the first embodiment shown in FIG. 1, the first lifting rings 118 may be connected to the second side 112 and/or the first side 111 of the frame 100. The first lifting rings 118 may be used to rig the cutting apparatus 10 into position for cutting a pipe and/or other structure.

Figure 1:
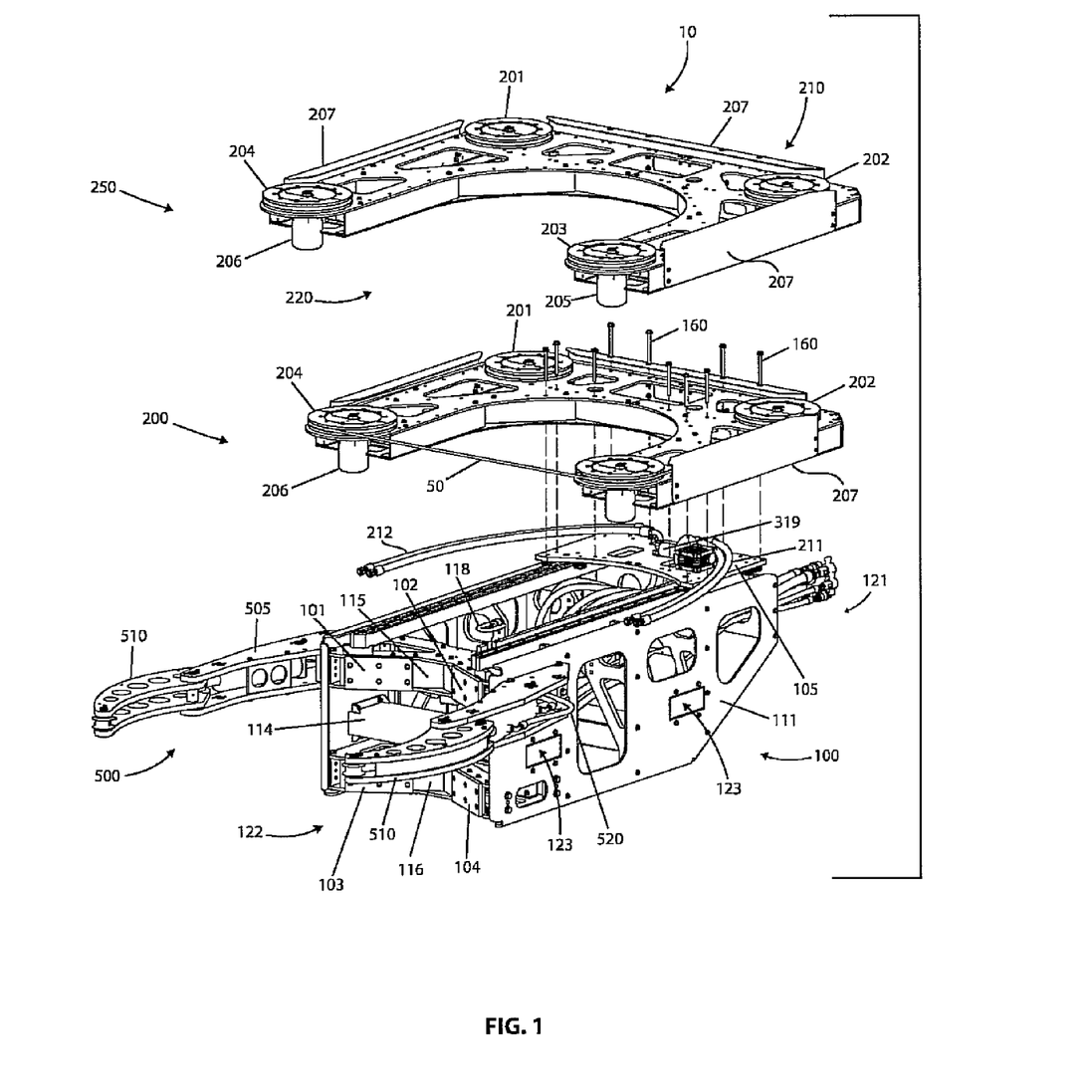
FIG. 1 illustrates an exploded perspective view of a cutting apparatus in a first embodiment of the present invention.
Figure 2:
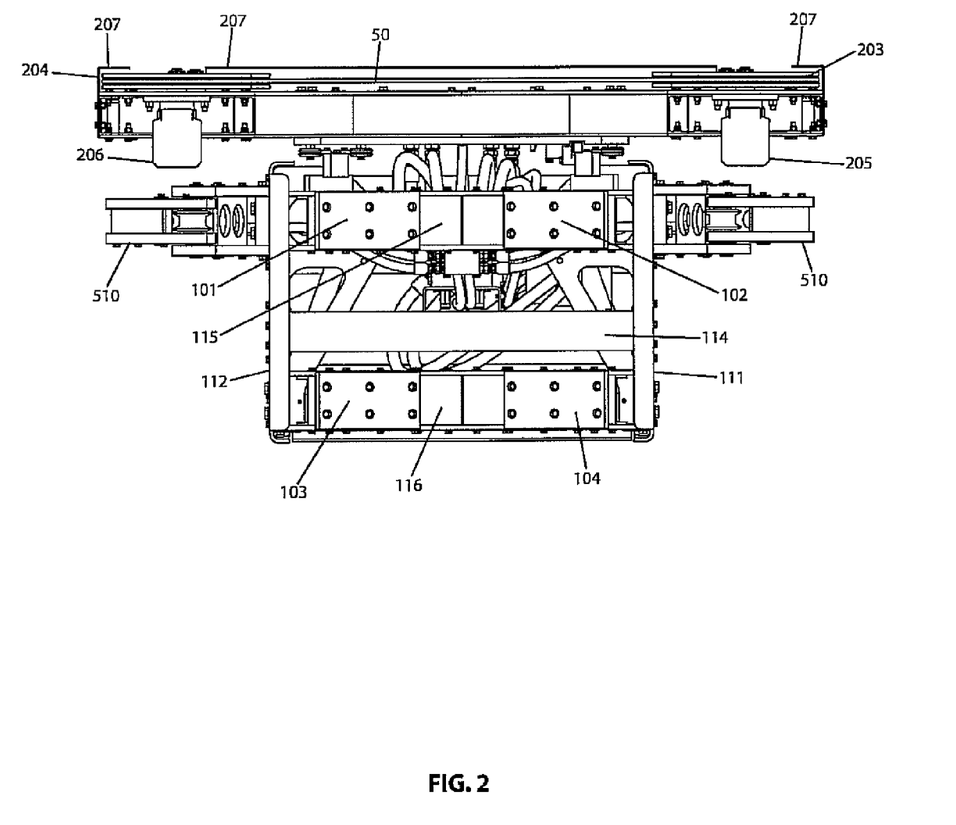
FIG. 2 illustrates a front view of a cutting apparatus in the first embodiment of the present invention.
Figure 4:
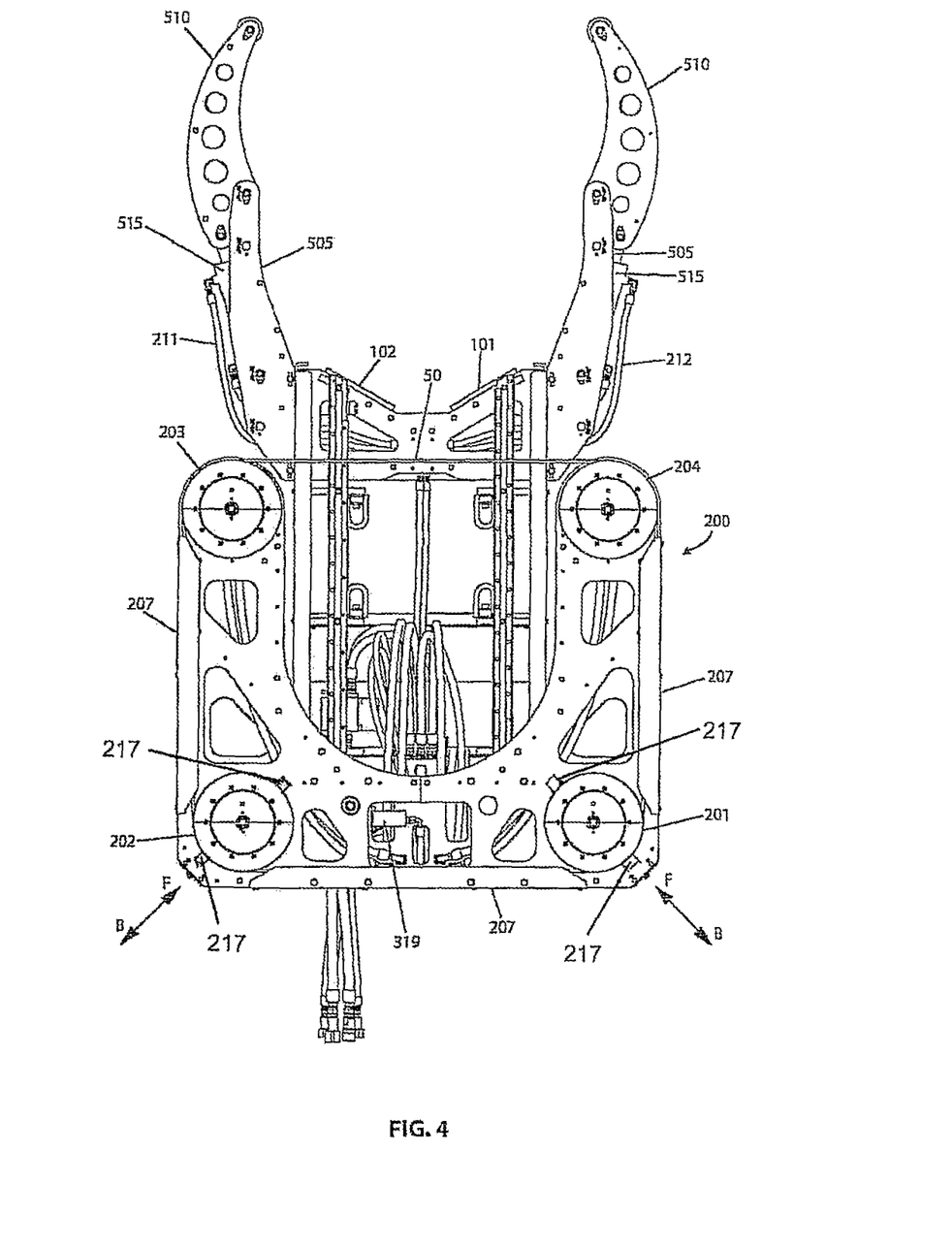
FIG. 4 illustrates a top view of a cutting apparatus in the first embodiment of the present invention.
Figure 8:
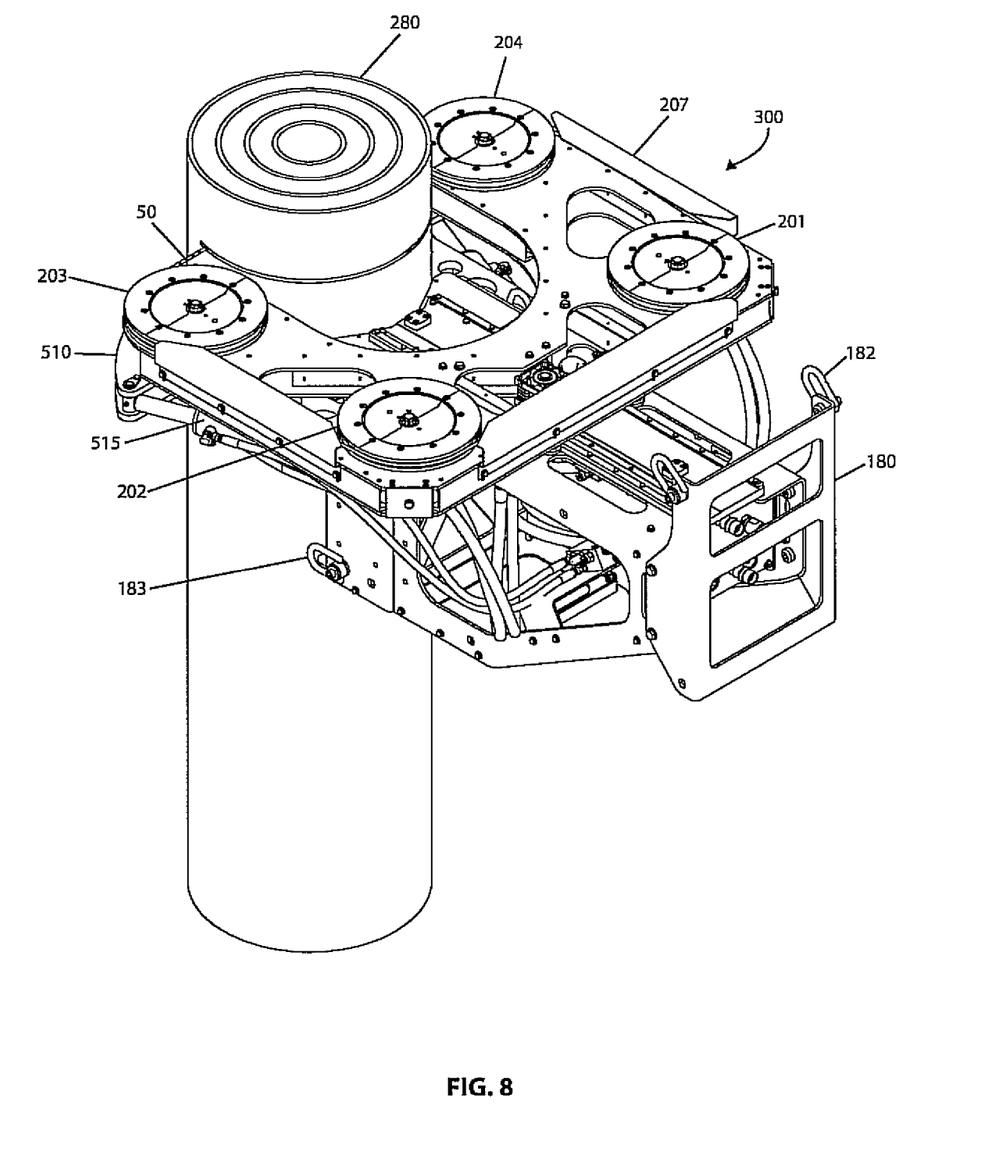
FIG. 8 illustrates a perspective view of a cutting apparatus in the second embodiment of the present invention cutting a pipeline.

In an embodiment, the frame 100 may have one or more plates connected thereto. For example, as shown in FIGS. 1, 2 and 4, a first alignment plate 101 and/or a second alignment plate 102 may be connected to the first crossbar 115 of the frame 100. The first crossbar 115 may have an angled surface arranged so that the first alignment plate 101 and/or the second alignment plate 102 may face inwardly toward each other. Similarly, a third alignment plate 103 and/or a fourth alignment plate 104 may be connected to the second crossbar 116 of the frame 100. The second crossbar 116 may have an angled surface arranged so that the third alignment plate 103 and/or the fourth alignment plate 104 may face inwardly toward each other. As shown in FIG. 8, the first alignment plate 101 and/or the second alignment plate 102 on the first crossbar 115 and/or the third alignment plate 103 and/or a fourth alignment plate 104 on the second crossbar 116 may contact a pipe 280 to align the pipe 280 with the cutting apparatus 10 for cutting the pipe 280 with the wire 50.

In an embodiment, one or more of the first alignment plate 101, the second alignment plate 102, the third alignment plate 103 and/or the fourth alignment plate 104 may provide a substantially flat surface which may face away from the frame 100. The first alignment plate 101, the second alignment plate 102, the third alignment plate 103 and/or the fourth alignment plate 104 may be any shape. In an embodiment, the first alignment plate 101, the second alignment plate 102, the third alignment plate 103 and/or the fourth alignment plate 104 may be substantially rectangular. As described and shown, the first alignment plate 101 and the second alignment plate 102, as well as, the third alignment plate 103 and the fourth alignment plate 104, may be angled relative to each other to align the pipe 280 with the cutting apparatus 10. In an embodiment, the first alignment plate 101, the second alignment plate 102, the third alignment plate 103 and/or the fourth alignment plate 104 may be constructed of any appropriate material. For example, the first alignment plate 101, the second alignment plate 102, the third alignment plate 103 and/or the fourth alignment plate 104 may be constructed of nylon, or in particular, nylon 6.

As shown in FIG. 8, the pipe 280 to be cut may be a multi-casing pipe 280 having aggregates filling the casings and/or the pipe 280. The present invention is not limited to cutting a pipe, and any object may be cut using the cutting apparatus 10. During a cutting operation, the pipe 280 may be oriented relative to the cutting apparatus 10 as described in more detail hereafter.

Referring again to the first embodiment of the cutting apparatus 10 illustrated in FIG. 1, the cutting apparatus 10 may have a second deck 250. The second deck 250 may be substantially similar to the first deck 200. Like numerals indicate like parts on the first deck 200 and the second deck 250. However, the first deck 200 and the second deck 250 may have different dimensions. For example, the first deck 200 may have a width of 40 inches, and the second deck 250 may have a width of 48 inches. Of course, different widths are possible, and the present invention is not limited to the specific sizes disclosed. One skilled in the art may determine that another size may be used without departing from the scope of the present invention.

The cutting apparatus 10 may have modular decks to either reduce and/or increase the overall size of the cutting apparatus 10. This modular capability of the cutting apparatus 10 has several advantages. Different widths and/or overall sizes of the decks may be advantageous to permit cutting different sizes of pipes and/or structures in different environments.

One advantage may be to reduce the size of the cutting apparatus 10. Reducing the size of the deck may permit the cutting apparatus 10 to be used in a tighter, more constrained work environment when a smaller deck is used on the cutting apparatus 10. The cutting apparatus 10 may be positioned where a larger saw may not fit. Thus, some applications may require that the cutting apparatus 10 be equipped with a smaller deck due to the spatial constraints of the particular cutting environment.

Another advantage of the present invention having modular decks may be to increase the overall size of the cutting apparatus 10. For example, certain cutting applications may require a larger deck to accommodate cutting a larger pipe and/or structure. The greater width of the deck may permit a larger pipe and/or structure to be cut with the cutting apparatus 10.

In the present invention, either the first deck 200 or the second deck 250 may be selected depending on the application and used as desired to perform a cutting operation on a particular pipe and/or structure. Thus, the ability to remove one deck and replace that deck with another deck is an advantageous feature of the present invention. The cutting apparatus 10 may be modular and provide interchangeable decks for cutting different pipes and/or structures.

As disclosed and shown in the figures, the first deck 200 and the second deck 250 may be interchanged on the cutting apparatus 10. The first deck 200 and the second deck 250 may be interchanged in a manner to reduce and/or increase the overall dimensions of the cutting apparatus 10 to thereby achieve the benefits and advantages of the invention described herein.

As shown in the first embodiment illustrated in FIG. 1, the first deck 200 and the second deck 250 may be interchanged on the cutting apparatus 10 as follows. First, the first hydraulic lines 211 may be disconnected from the first drive pulley motor 205, and the second hydraulic lines 212 may be disconnected from the second drive pulley motor 206. This step is necessary for safety and for proper removal of the first deck 200. Damage to the first hydraulic lines 211 and/or the second hydraulic lines 212 during the removal of the first deck 200 and/or the replacement of the second deck 250 may render the cutting apparatus 10 inoperable and/or unsafe. Thus, disconnection of the first hydraulic circuit 301 before removal of the first deck 200 and/or replacement of the second deck 250 is recommended.

Second, after the first hydraulic lines 211 have been disconnected from the first drive pulley motor 205, and the second hydraulic lines 212 have been disconnected from the second drive pulley motor 206, the first deck 200 may be removed from the feed plate 105 on the frame 100. The first deck 200 may be removed by removing fasteners 160. In the first embodiment illustrated in FIG. 1, 10 fasteners 160 may be used to secure the first deck 200. However, the number of fasteners 160 that may be used may be different depending upon certain design and/or strength factors of the cutting apparatus 10. The fasteners 160 may be cap screws, bolts or other fasteners sufficient to secure the first deck 200 to the feed plate 105 of the frame 100.

Third, the second deck 250 may be attached to the feed plate 105 using the fasteners 160. The fasteners 160 may secure the second deck 250 to the feed plate 105.

Fourth, the first hydraulic lines 211 may be connected to the first drive pulley motor 205, and the second hydraulic lines 212 may be connected to the second drive pulley motor 206 on the second deck 250.

Thus, the interchanging process in the first embodiment may include the steps of:

(1) disconnecting the first hydraulic lines 211 from the first drive pulley motor 205 and the second hydraulic lines 212 from the second drive pulley motor 206 on the first deck 200;

(2) removing the first deck 200 from the feed plate 105 by removing the fasteners 160;

(3) attaching the second deck 250 to the feed plate 105 by using the fasteners 160; and (4) connecting the first hydraulic lines 211 to the first drive pulley motor 205 and the second hydraulic lines 212 to the second drive pulley motor 206 on the second deck 250.

In addition, the diamond wire 50 may be removed from the first deck 200. Tension on the wire 50 may be reduced by adjusting the first pulley 201 and/or the second pulley 202 located at the first end 210 of the first deck 200. The first pulley 201 and/or the second pulley 202 may act as tensioners for the wire 50. Adjusting the first pulley 201 and/or the second pulley 202 may loosen the wire 50 to enable removal of the wire 50 from the cutting apparatus 10. For example, referring the FIG. 4, adjusting the first pulley 201 and/or the second pulley 202 in a direction away from the first end 210 of the first deck 200 and toward the second end 220 of the first deck 200 may provide some slack in the wire 50. The first pulley 201 and/or the second pulley 202 may be adjusted by moving the first pulley 201 and/or the second pulley 202 forward and/or backward in a slot 217 in the first deck 200. To provide more tension on the wire 50, the first pulley 201 and/or the second pulley 202 may be adjusted by moving the first pulley 201 and/or the second pulley 202 backward in each respective slot 217 toward the first end 210 of the first deck 200. The adjustment of the first pulley 201 and/or the second pulley 202 in the respective slot 217 may be in a forward direction F or a backward direction B as indicated by arrows shown in FIG. 4. Thus, adjustment in the forward direction F may introduce some slack in the wire 50 which may reduce the tension in the wire 50, and adjustment in the backward direction B may increase the tension in the wire 50.

Referring now to FIGS. 5-8 wherein like numerals refer to like parts, a second embodiment of the cutting apparatus 10 of the present invention is illustrated. In the second embodiment of the present invention, the cutting apparatus 10 may have a third deck 300 and a fourth deck 350. The third deck 300 and the fourth deck 350 may be substantially similar to the first deck 200 and the second deck 250 respectively of the first embodiment illustrated in FIG. 1, wherein like numerals indicate like parts. However, the third deck 300 and the fourth deck 350 may have different dimensions. For example, the third deck 300 may have a width of 26 inches, and the fourth deck 350 may have a width of 30 inches. Of course, different widths are possible, and the present invention is not limited to the specific sizes disclosed. One skilled in the art may determine that another size may be used without departing from the scope of the present invention.

The third deck 300 may be connected to the feed plate 105 by fasteners 170. In the second embodiment illustrated in FIG. 5, four fasteners 160 may be used to secure the third deck 300 to the feed plate 105. In the second embodiment, an end plate 180 may be connected to the first end 121 of the frame 100. The end plate 180 may have second lifting rings 182. In addition, as illustrated in the second embodiment shown in FIGS. 5-8, the frame 100 may have third lifting rings 183. For example, the third lifting rings 183 may be connected to the second side 112 and/or the first side 111 of the frame 100. The second lifting rings 182 and/or the third lifting rings 183 may be used to rig the cutting apparatus 10 into position for cutting a pipe and/or other structure. The second lifting rings 182 and/or the third lifting rings 183 may also be used to transport the cutting apparatus 10.

In the second embodiment shown in FIGS. 5-8, the frame 100 may have a third crossbar 185 and a fourth crossbar 186 located at the second end 122 of the frame 100. Both the third crossbar 185 and the fourth crossbar 186 may connect the first side 111 of the frame 100 to the second side 112 of the frame 100. The third crossbar 185 and/or the fourth crossbar 186 may be substantially perpendicular to the first side 111 and/or the second side 112 of the frame 100. The third crossbar 185 and the fourth crossbar 186 may be substantially parallel to each other.

Figure 5:
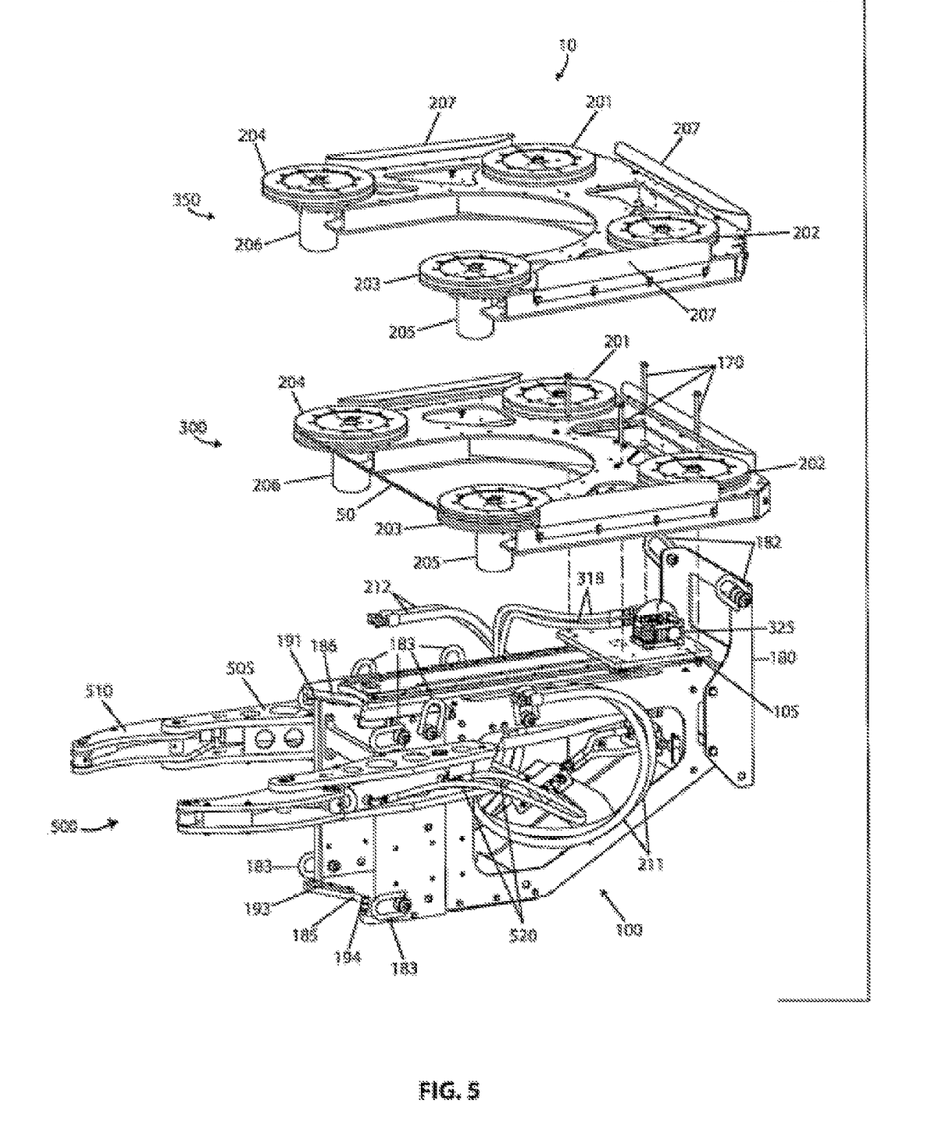
FIG. 5 illustrates an exploded perspective view of a cutting apparatus in a second embodiment of the present invention.
Figure 6:
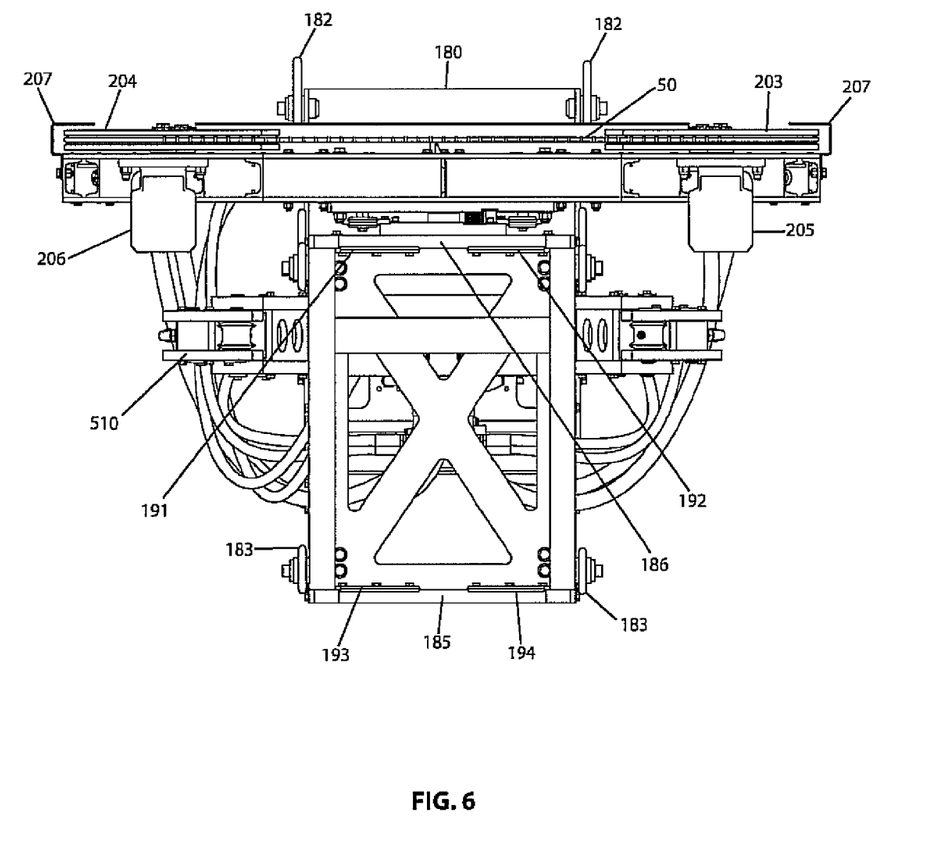
FIG. 6 illustrates a front view of a cutting apparatus in the second embodiment of the present invention.

In an embodiment, the frame 100 may also have one or more contact plates connected thereto. For example, as shown in FIGS. 5 and 6, a first contact plate 191 and/or a second contact plate 192 may be connected to the third crossbar 185 of the frame 100. The third crossbar 185 may have an angled surface arranged so that the first contact plate 191 and/or the second contact plate 192 may face inwardly toward each other. Similarly, a third contact plate 193 and/or a fourth contact plate 194 may be connected to the fourth crossbar 186 of the frame 100. The fourth crossbar 186 may have an angled surface arranged so that the third contact plate 193 and/or the fourth contact plate 194 may face inwardly toward each other.

As shown in FIG. 8, the first contact plate 191, the second contact plate 192, the third contact plate 193 and/or the fourth contact plate 194 may contact the pipe 280 to align the pipe 280 with the cutting apparatus 10 for cutting the pipe 280 with the wire 50. In the second embodiment, one or more of the first contact plate 191, the second contact plate 192, the third contact plate 193 and the fourth contact plate 194 may provide a substantially flat surface which may face away from the frame 100. The first contact plate 191, the second contact plate 192, the third contact plate 193 and/or the fourth contact plate 194 may be any shape and may be constructed of any appropriate material. For example, the first contact plate 191, the second contact plate 192, the third contact plate 193 and/or the fourth contact plate 194 may be constructed of metal. The first contact plate 191, the second contact plate 192, the third contact plate 193 and/or the fourth contact plate 194 may act as a knife edge to hold the pipe 280 when contacting the pipe 280 as shown in FIG. 8. Also as described and shown, the first contact plate 191 and the second contact plate 192, as well as, the third contact plate 193 and the fourth contact plate 194, may be angled relative to each other to align the pipe 280 with the cutting apparatus 10.

Referring again to the second embodiment illustrated in FIG. 8, the wire 50 may cut the pipe 280 with a substantially linear cut such that the cut may form one plane as shown in FIG. 8. The wire 50 may travel in a clockwise direction indicated by arrow W as shown in FIG. 8. The first pulley 201, the second pulley 202, the third pulley 203 and/or the fourth pulley 204 may rotate the wire 50 relative to the plane of the cut. Rotation of the wire 50 relative to the plane of the cut may increase use of the surface area of the wire 50. Increased use of the surface area of the wire 50 may decrease wear of the wire 50. The present invention is not limited to cutting a pipe; any object may be cut using the cutting apparatus 10.

In an embodiment, hydraulics may be used for certain operations on the cutting apparatus 10. For example, hydraulics may be used to operate the first drive pulley motor 205 and/or the second drive pulley motor 206 for driving the third pulley 203 and/or the fourth pulley 204, respectively, to circulate and/or rotate the wire 50 in a cutting operation.

Figure 3A:
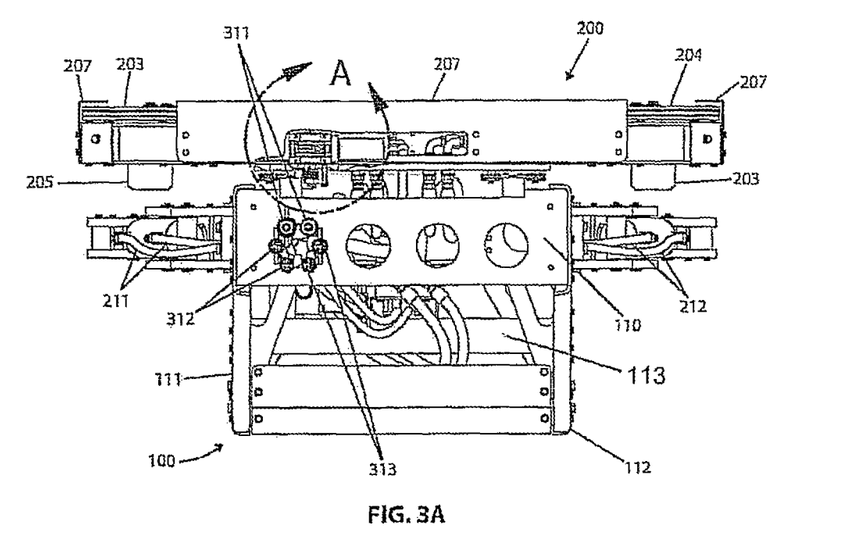
FIG. 3A illustrates a rear view of a cutting apparatus in the first embodiment of the present invention.
Figure 7:
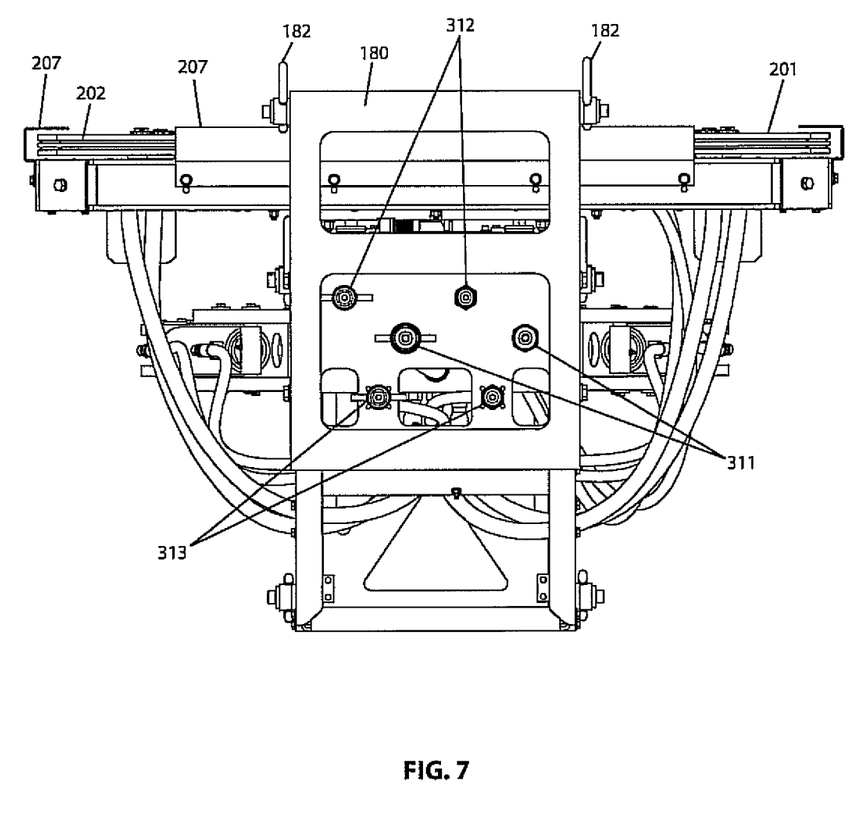
FIG. 7 illustrates a back view of a cutting apparatus in the second embodiment of the present invention.

FIG. 3A is a rear view of the first embodiment of the cutting apparatus 10 and illustrates hydraulic couplings. Similarly, FIG. 7 is a rear view of the second embodiment of the cutting apparatus 10 and illustrates hydraulic couplings wherein like numerals represent like parts. Specifically, a first pair of couplings 311 is shown. The first pair of couplings 311 may be a brass hydraulic thread-to-connect coupler with an iron wing nut coupling as shown. One having ordinary skill in the art may recognize that other types of couplings may be used. The first pair of couplings 311 may be used for the first hydraulic circuit 301. The first hydraulic circuit 301 may be used to operate the first drive pulley motor 205 for driving the third pulley 203 and the second drive pulley motor 206 for driving the fourth pulley 204 to circulate and/or rotate the wire 50 in a cutting operation. FIG. 9 illustrates a schematic diagram of the first hydraulic circuit 301.

Referring now to FIG. 9, the first hydraulic circuit 301 is shown. The hydraulic line 211 may be connected between the first pair of couplings 311 and the first drive pulley motor 205. The hydraulic line 211 may be connected between the first pair of couplings 311 and the second drive pulley motor 206. A crossover relief 314 may be provided between the first pair of couplings 311 and the first drive pulley motor 205 and the second drive pulley motor 206. A flow divider 315 may also be connected to the at least on of the first pair of couplings 311.

The first hydraulic circuit 301 may be used to operate the first drive pulley motor 205 for driving the third pulley 203 and/or second drive pulley motor 206 for driving the fourth pulley 204 to circulate and/or rotate the wire 50 in a cutting operation. The first hydraulic circuit 301 may use hydraulic pressure to operate the hydraulic first drive pulley motor 205 to drive the third pulley 203 and/or second drive pulley motor 206 to drive the fourth pulley 204.

As shown, the first drive pulley motor 205 may be connected to the motorized third pulley 203. The first drive pulley motor 205 may have a shaft 316 connected to the third pulley 203 to impart rotation to the third pulley 203 as shown by an arrow R in FIG. 9. The motorized third pulley 203 may rotate to direct the wire 50 through the first pulley 201, the second pulley 202, the third pulley 203 and/or the fourth pulley 204. The first drive pulley motor 205 may control a rotation rate of the third pulley 203. The first drive pulley motor 205 may control a wire speed at which the wire 50 travels through the first pulley 201, the second pulley 202, the third pulley 203 and/or the fourth pulley 204 by adjusting the rotation rate of the motorized pulley.

Similarly, the second drive pulley motor 206 may be connected to the motorized fourth pulley 204. The second drive pulley motor 209 may have a shaft 317 connected to the fourth pulley 204 to impart rotation to the fourth pulley 204 as shown by an arrow R in FIG. 9. The motorized fourth pulley 203 may rotate to direct the wire 50 through the first pulley 201, the second pulley 202, the third pulley 203 and/or the fourth pulley 204. The second drive pulley motor 205 may control a rotation rate of the motorized third pulley 203. The second drive pulley motor 206 may control a wire speed at which the wire 50 travels through the first pulley 201, the second pulley 202, the third pulley 203 and/or the fourth pulley 204 by adjusting the rotation rate of the motorized pulley.

Figure 10:
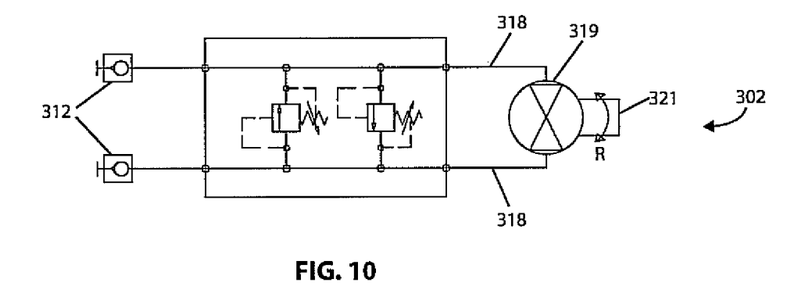
FIG. 10 illustrates a schematic diagram of a second hydraulic circuit for moving a deck relative to a frame of a cutting apparatus in an embodiment of the present invention.

FIG. 3A also illustrates a second pair of couplings 312. The second pair of couplings 312 may be a brass hydraulic thread-to-connect coupler plug. One having ordinary skill in the art may recognize that other types of couplings may be used. The second pair of couplings 312 may be part of a second hydraulic circuit 302. The second hydraulic circuit 302 may be used to operate a feed motor 319 for translating the first deck 200 relative to the frame 100 into the pipe 280 and/or a structure in a cutting operation. FIG. 10 illustrates a schematic diagram of the second hydraulic circuit 302 for moving the first deck 200 relative to the frame 100 of a cutting apparatus 10 in an embodiment of the present invention.

FIG. 10 illustrates a schematic diagram of the second hydraulic circuit 302. As shown in FIG. 5, hydraulic lines 318 may be connected to the second pair of couplings 312 for carrying hydraulic fluid through the second hydraulic circuit 302. The second hydraulic circuit 302 may also have dual crossover relief valves 320. The crossover relief valves 320 may provide pressure surge protection for double acting hydraulic actuators (not shown). The feed motor 319 may have a shaft 321 to impart rotation as shown by an arrow R in FIG. 10.

Translational movement of the first deck 200 relative to the frame 100 may be described with reference to the figures. As generally illustrated in the figures, the first deck 200 may be in a first position relative to the frame 100. In the first position, the first end 210 of the first deck 200 may be adjacent to the first end 121 of the frame 100. In the first position, the second end 220 of the first deck 200 may be near to the second end 122 of the frame 100.

As generally illustrated in the figures, operation of the feed motor 319 in conjunction with movement of other components may move the first deck 200 from the first position to a second position relative to the frame 100. The second position may be considered an extended position. In the extended position, the first end 210 of the first deck 200 may be located between the first end 121 of the frame 100 and the second end 122 of the frame 100. Movement of the first deck 200 from the first position to the extended position may move the second end 220 of the first deck 200 away from the second end 122 of the frame 100. As shown, the translational movement of the first deck 200 may be about a center longitudinal axis of the cutting apparatus 10.

Movement of the first deck 200 from the first position to the extended position may occur as follows and may involve the following components. As shown in FIGS. 1, 3A and 5, the feed motor 319 may be mounted to a top surface of the feed plate 105. The feed motor 319 may be connected to a speed reduction gearbox 325. The speed reduction gearbox 325 may connect to a gear 326 via a shaft 327. The gear 326 may have gear teeth 334. The gear 326 may also be in contact with a rack 328 on the frame 100. The rack 328 may also have teeth 333.

Figure 3B:
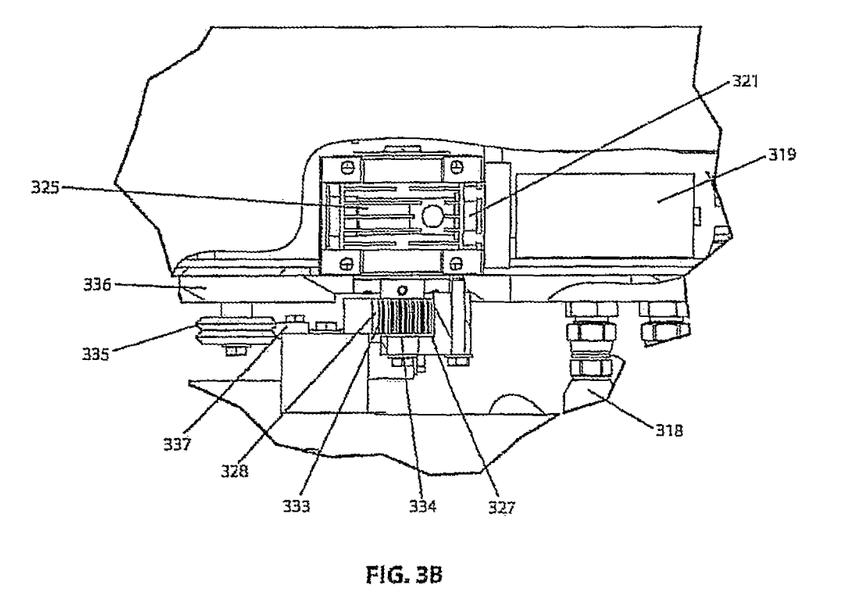
FIG. 3B illustrates a detail view delineated by circle "A" of FIG. 3A of a cutting apparatus in the first embodiment of the present invention.

As shown in FIG. 3B, the first deck 200 may have dual v-rollers 335 connected to a roller plate 336. As also shown in FIG. 3B, the frame 100 may have a v-rail 337 located adjacent to and in contact with the v-rollers 335. Thus, rotation of the gear 326 may be translated into linear movement of the first deck 200 when the gear teeth 334 on the gear 326 engage the teeth 333 on the rack 328. The v-rollers 335 on the first deck 200 may travel on the v-rails 337 on the frame 100 so that the first deck 200 may be linearly moved from the first position to the extended position by means of the rotational engagement of the gear teeth 334 on the gear 326 with the teeth 333 on the rack 328. The alignment of the v-rollers 335 on the first deck 200 with the v-rail 337 on the frame 100 may cause linear movement of the first deck 200 from the first position to the extended position. FIG. 8 illustrates the third deck 300 in the extended position with respect to the frame 100 so that the wire 50 may travel into and through the pipe 280 during a cutting operation.

Thus, the first deck 200 may be moved from the first position to the extended position by operating the feed motor 319 using the second hydraulic circuit 302. Hydraulic fluid may drive the shaft 321 of the feed motor 319. The rotational movement of the feed motor 319 may be reduced by the speed reduction gearbox 325 and may rotate the shaft 327. The shaft 327 may drive the gear 326. The rotation of the gear 326 may be translated into linear movement of the first deck 200 when the gear teeth 334 on the gear 326 engage the teeth 333 on the rack 328.

As shown in FIG. 8, movement of the third deck 300 from the first position to the second position may move the wire 50 through the pipe 280. Movement of the wire 50 through the first pulley 201, the second pulley 202, the third pulley 203 and/or the fourth pulley 204 during movement of the wire 50 through the pipe 280 may cut the pipe 280. For example, the first pulley 201, the second pulley 202, the third pulley 203 and/or the fourth pulley 204 may rotate relative to the third deck 300 as the pipe 280 is cut and/or may transfer torque to the wire 50 as the pipe 280 is cut.

The third deck 300 may also move from the second position to the first position. For example, the third deck 300 may move from the second position to the first position after cutting the pipe 280. As a further example, the third deck 300 may move from the second position to the first position to replace the wire 50 without removing the cutting apparatus 10 from the pipe 280.

Movement of the third deck 300 from the second position to the first position relative to the frame 100 may enable the cutting apparatus 10 to be stored and/or to be transported to another location to cut another object. As discussed previously, the movement of the third deck 300 from the extended position to the first position relative to the frame 100 may enable replacement of the wire 50 without removing the cutting apparatus 10 from the pipe 280. For example, the movement of the third deck 300 from the extended position to the first position relative to the frame 100 may enable replacement of the wire 50 from a rear of the cutting apparatus 10 such that a position of the pipe 280 relative to the cutting apparatus 10 may be maintained.

In another embodiment, the present invention may use a clamp system 500 as disclosed in Shae et al. in U.S. Patent Application Publication No. 2011/0211543 A1, assigned to the assignee of the present application, and incorporated herein by reference in its entirety. As generally illustrated in FIGS. 20, 21, 22A and 22B of Shae et al., the cutting apparatus 10 may have the clamp system 500 for aligning the pipe 280 and/or maintaining a position of the pipe 280 relative to the cutting apparatus 10. Further, the present invention is not limited to a specific means of aligning the pipe 280 and/or maintaining the position of the pipe 280 relative to the cutting apparatus 10. For example, the cutting apparatus 10 may use magnets, a tensioned chain, a tensioned cable and/or the like to align the pipe 280 and/or maintain the position of the pipe 280 relative to the cutting apparatus 10. As shown in FIGS. 1, 2, 4, 5 and 6, an embodiment of the clamp system 500 may have clamp arms 505 attached at the second end 122 of the frame 100. The clamp arms 505 may also have an articulating portion 510. The clamp arms 505 and the articulating portion 510 may be operated by hydraulic cylinders 515. The hydraulic cylinders 515 may be connected to hydraulic lines 520.

Thus, hydraulics may also be used to operate the clamp system 500 to aid in holding the pipe 280 in place during a cutting operation. FIG. 3A shows a third pair of couplings 313. The third pair of couplings 313 may be the same type as the second pair of couplings 312. The third pair of couplings 313 may be part of a third hydraulic circuit 303.

Thus, in the first embodiment shown in FIG. 3A and the second embodiment shown in FIG. 7, the hydraulic couplings may be grouped in a single location for ease of connection and access. For example, FIG. 3A shows all of the hydraulic couplings arranged on the end bar 110 at the first end 121 of the frame 100. FIG. 3A shows the first pair of couplings 311 for the drive circuit for the first drive motor 205 and the second drive motor 206 for driving the third pulley 203 and the fourth pulley 204, respectively. Also, FIG. 3A shows the second pair of couplings 312 for the feed circuit for translation of the first deck 200 relative to the frame 100. Finally, FIG. 3A shows the third pair of couplings 313 for the operation of the clamp system 500. For the second embodiment shown in FIG. 7, all of the hydraulic couplings may be arranged on the end plate 180 at the first end 121 of the frame 100.

Figure 11:
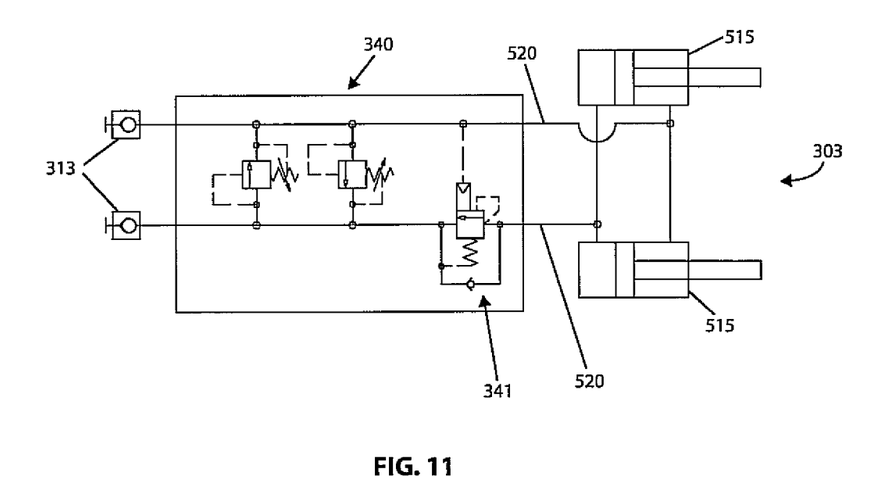
FIG. 11 illustrates a schematic diagram of a third hydraulic circuit for operating clamp arms of a cutting apparatus in an embodiment of the present invention.

FIG. 11 illustrates a schematic diagram of the third hydraulic circuit 303 for operating clamp system 500 in an embodiment of the present invention. The third hydraulic circuit 303 may have a crossover relief 340 with a counterbalance valve 341 to lock the hydraulic cylinders 515. The third hydraulic circuit 303 may enable the clamp arms 505 and the articulating portion 510 to be operated by the hydraulic cylinders 515. As shown in FIG. 8, the pipe 280 may be held in place by the clamp system 500 during a cutting operation by the cutting apparatus 10.

Moreover, operation of the cutting apparatus 10 and/or the clamp system 500 may be controlled remotely, such as, for example, as disclosed in Shae et al. Operation of the cutting apparatus 10 and/or the clamp system 500 may be controlled remotely, such as, for example, by a ROV interface as known to one having ordinary skill in the art. For example, the cutting apparatus 10 may be located underwater to cut a pipe 280 located underwater, and the cutting apparatus 10 may be controlled from a vessel located at the water surface.

The cutting apparatus 10 and/or the clamp system 500 may be controlled by instructions from a remote location relative to the cutting apparatus 10 using the ROV interface. For example, a terminal (not shown) may be located remote relative to the cutting apparatus 10, and/or the terminal may provide the ROV interface to a user of the terminal. The terminal may transmit instructions from the user to the cutting apparatus 10. The terminal may be, for example, a desktop PC, a personal digital assistant (PDA), a mobile telephone, a laptop PC and/or any electronic device which may be capable of receiving and transmitting the instructions to the cutting apparatus 10. The present invention is not limited to a specific embodiment of the terminal or the instructions.

The instructions may direct operation of the cutting apparatus 10. Thus, the instructions may move the first deck 200 from the second position to the first position relative to the frame 100. Further, the instructions may control a feed rate. The feed rate may be a speed of movement of the first deck 200 relative to the frame 100. Thus, the instructions may increase and/or may decrease the feed rate.

In an embodiment, a circuit (not shown) may automatically control the feed rate. Adjustment of the feed rate may maintain a tension in the wire 50 to be equal to a predetermined tension. For example, as the first deck 200 moves, the tension in the wire 50 may act against a spring (not shown) which may be attached to a hydraulic control valve. As the wire 50 advances into the pipe 280, the tension in the wire 50 may increase so that the spring may be deflected. As the spring deflects the hydraulic control valve, flow of hydraulic oil may be reduced. Reduced flow of hydraulic oil may decrease the feed rate. Therefore, the circuit may compensate for a size of the pipe 280, an amount and/or a type of material located in the pipe 280, and/or other conditions. Accordingly, the feed rate may be maintained at the predetermined feed rate and/or the tension in the wire 50 may stay constant during cutting of the pipe 280.

As discussed, the drive pulley motor 205 may adjust the speed of the motorized pulley to control the feed rate at which the wire 50 may travel through the first pulley 201, the second pulley 202, the third pulley 203 and/or the fourth pulley 204. The ROV interface may be used by the user and/or the terminal to adjust the speed of the motorized pulley. Adjustment of the speed of the motorized pulley may control the wire speed at which the wire 50 travels through the first pulley 201, the second pulley 202, the third pulley 203 and/or the fourth pulley 204. For example, the instructions transmitted from the terminal to the cutting apparatus 10 may adjust the speed of the motorized pulley.

The cutting apparatus 10 may transmit information to the terminal. For example, tools (not shown) may be attached to the cutting apparatus 10, and/or the tools may obtain the information and/or may transmit the information to the terminal. For example, one or more of the tools may be a video camera that may obtain video data and/or may transmit the video data to the terminal. The terminal may use the ROV interface to display the video data to the user. As a further example, one or more of the tools may be a light to enable the video camera to obtain the video data. As yet another example, one or more of the tools may be a sensor that may obtain a temperature of an environment in which the cutting apparatus 10 is located and/or a pressure of the environment in which the cutting apparatus 10 is located.

The sensor may transmit the temperature and/or the pressure to the terminal. The terminal may use the ROV interface to indicate the temperature and/or the pressure to the user. Even further, one or more of the tools may be a positioning tool that may determine a location of the cutting apparatus 10 and/or may transmit the location of the cutting apparatus 10 to the terminal. The terminal may use the ROV interface to indicate the location of the cutting apparatus 10 to the user. The present invention is not limited to a specific embodiment of the information and/or the tools.

Other variations and/or geometric configurations which are known to one having ordinary skill in the art are possible and are deemed to be within the scope of this disclosure. The materials used for the components of the cutting apparatus 10 may be selected from any suitable material to perform the desired function for operation of the cutting apparatus 10. The materials must also be capable of withstanding environmental conditions that may be encountered. Considerations of performance and/or reliability are also important in the selection of the material. Other materials which are known to one having ordinary skill in the art may be selected and are deemed to be within the scope of this disclosure. Further, known bonding techniques that are suitable for the type of material selected are considered to be within the scope of this disclosure.

As disclosed above, the cutting apparatus 10 may also be manufactured in numerous embodiments. The various embodiments of the cutting apparatus 10 may have additional components which may provide enhanced functionality of the cutting apparatus 10.

Moreover, the present invention is not limited to the specific arrangement of the components of the cutting apparatus 10 illustrated in the figures. It should be understood that various changes and modifications to the presently preferred embodiments described herein will be apparent to those having ordinary skill in the art. Such changes and modifications may be made without departing from the spirit and scope of the present invention and without diminishing its attendant advantages. It is, therefore, intended that such changes and modifications be covered by the appended claims.

We claim:

1. A modular cutting apparatus for cutting a pipe, the apparatus comprising:
    a frame having a first end and a second end located opposite to the first end, wherein the frame has a first side and a second side extending lengthwise from the first end to the second end, and the second side positioned opposite to the first side;
    a first deck having a first cutting wire attached to a first pulley, a second pulley, a third pulley, and a fourth pulley, wherein the first cutting wire travels through the first pulley, the second pulley, the third pulley, and the fourth pulley, and further wherein the first deck has a first circumference;
    a second deck having a second cutting wire attached to a first pulley, a second pulley, a third pulley, and a fourth pulley, wherein the second cutting wire travels through the first pulley, the second pulley, the third pulley, and the fourth pulley, wherein the second deck has a second circumference, and wherein the second circumference is different than the first circumference;
    a feed plate connected to the first end of the frame to secure either the first deck or the second deck to the feed plate, and further wherein the feed plate facilitates movement of either the first deck or the second deck relative to the frame and moves relative to the frame from a first position at the first end of the frame to a second position at the second end of the frame, and wherein the first deck and the second deck are interchangeably connected to the feed plate;
    a hydraulic circuit for driving the third pulley and the fourth pulley of the first deck and the second deck, wherein the third pulley and the fourth pulley rotate to direct the first cutting wire and the second cutting wire through the first pulley, the second pulley, the third pulley and the fourth pulley; and
    an end plate connected to the first end of the frame with lifting rings attached to and extending therefrom, wherein the lifting rings are used to move the frame to either cut the pipe or to transport the frame.

2. The apparatus of claim 1 further comprising:
a clamp at the second end of the frame.

3. The apparatus of claim 1 further comprising:
an alignment plate at the second end of the frame.

4. The apparatus of claim 1 further comprising:
a hydraulic circuit connected to the feed plate.

5. The apparatus of claim 1 wherein the first pulley is adjustable.

6. The apparatus of claim 1 further comprising:
a hydraulic circuit connected to a clamp at the second end of the frame.

7. The apparatus of claim 1 further comprising:
a safety guard connected to the first deck.

8. The apparatus of claim 1 further comprising:
rings connected to the frame.

9. The apparatus of claim 1 further comprising:
a first hollow bar and a second hollow bar positioned between the first side of the frame and the second side of the frame wherein each of the first hollow bar and the second hollow bar has an opening formed therein that aligns with a respective opening in the frame and further wherein the first bar and the second bar are substantially parallel to each other.

10. The apparatus of claim 1 further comprising:
an end plate having a plurality of hydraulic couplers connected at the first end of the frame.

11. The apparatus of claim 1 further comprising:
a drive train having a gear on the first deck and a rack on the frame wherein the gear engages the rack to move the first deck from the first position to the second position.

* * * * *